March 23, 1954 W. L. REITER 2,672,712
DUMMY FEED FOR STEM MACHINES
Filed Aug. 8, 1947 3 Sheets-Sheet 1
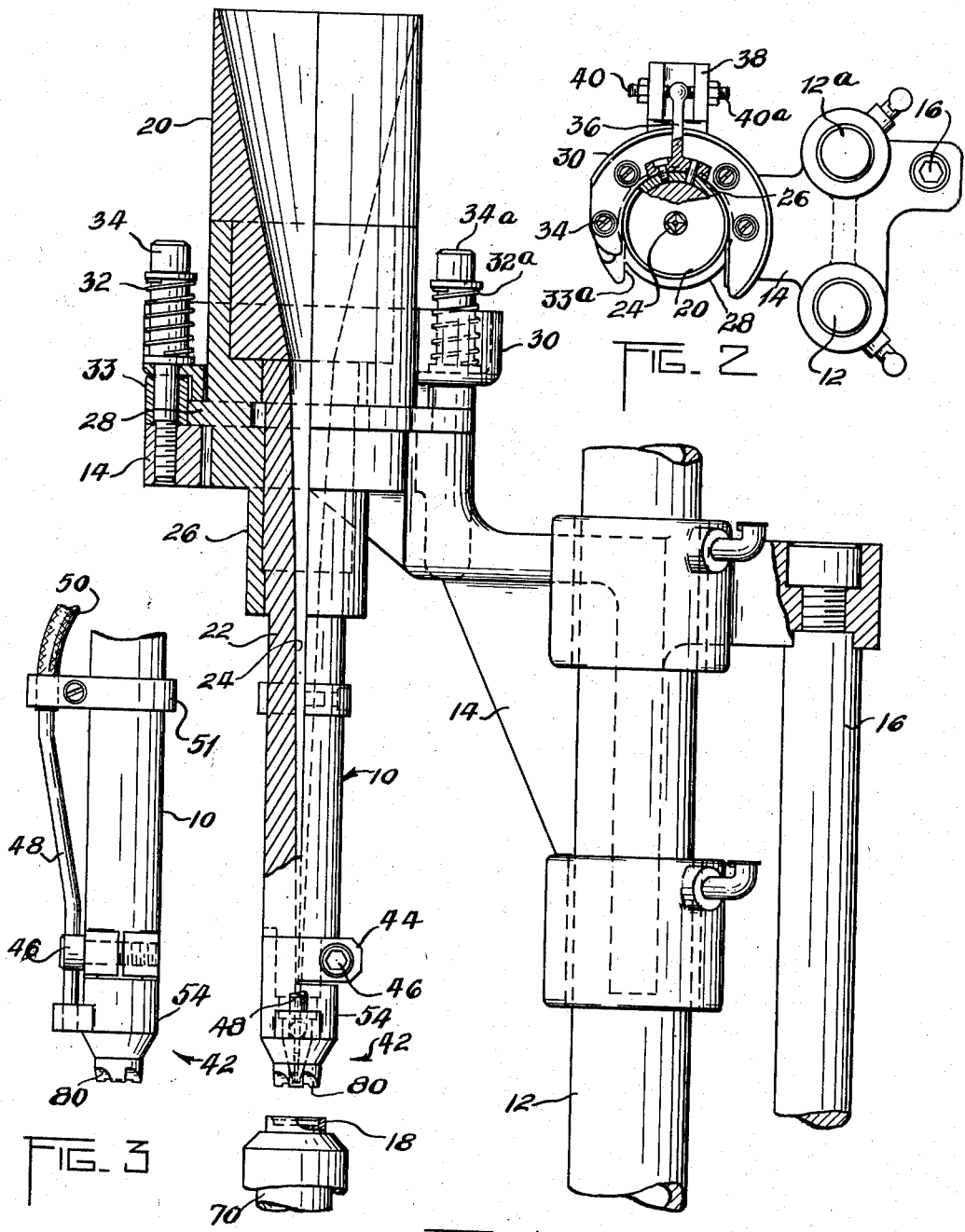
INVENTOR.
*William Leroy Reiter*
BY
*His Attorney*

March 23, 1954 — W. L. REITER — 2,672,712
DUMMY FEED FOR STEM MACHINES
Filed Aug. 8, 1947 — 3 Sheets-Sheet 2
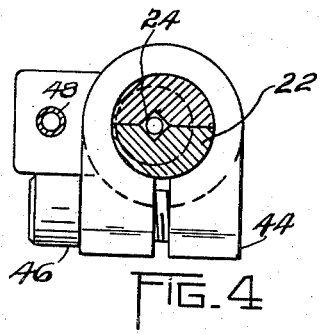
FIG. 4
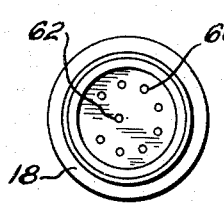
FIG. 6
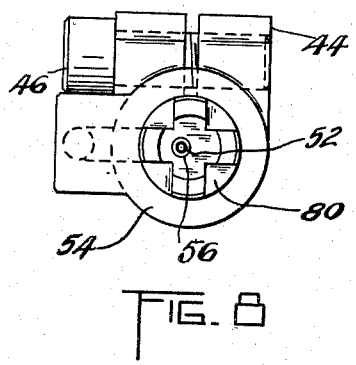
FIG. 8
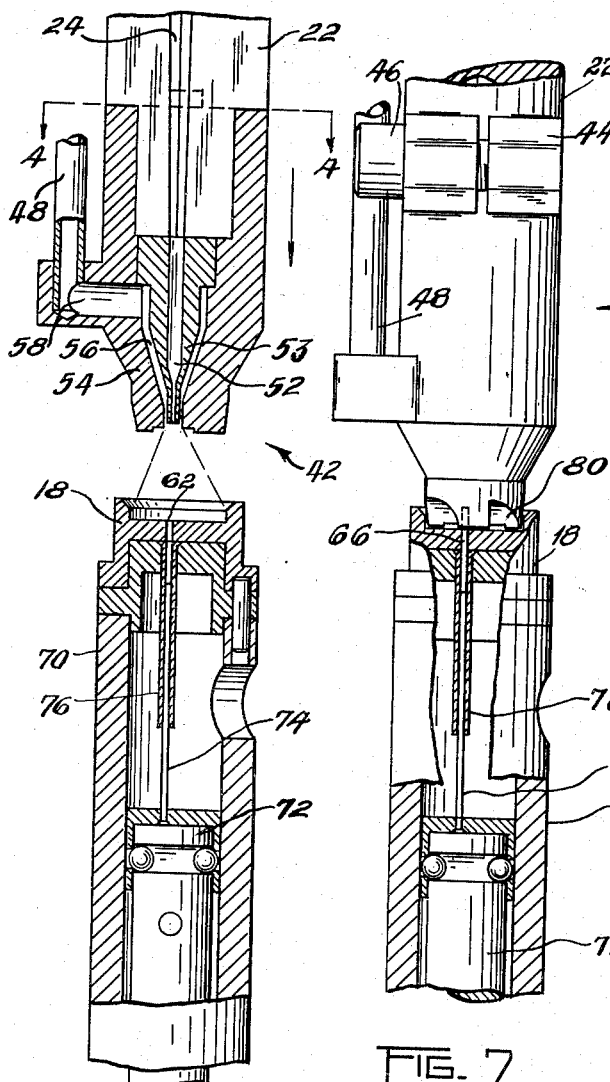
FIG. 5   FIG. 7
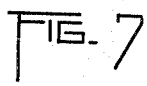
FIG. 9
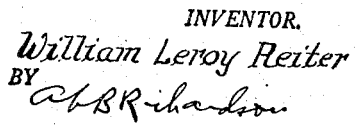
INVENTOR.
William Leroy Reiter
BY A. B. Richardson
His Attorney March 23, 1954 W. L. REITER 2,672,712
DUMMY FEED FOR STEM MACHINES
Filed Aug. 8, 1947 3 Sheets-Sheet 3
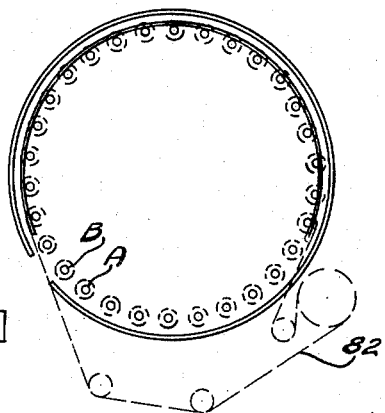
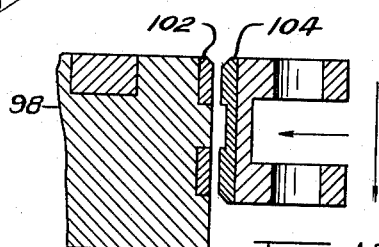
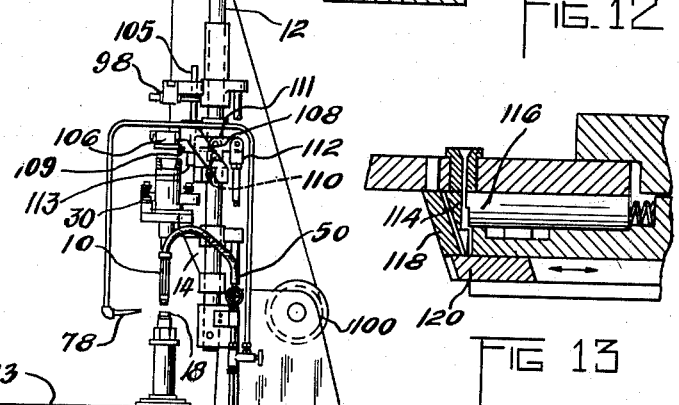
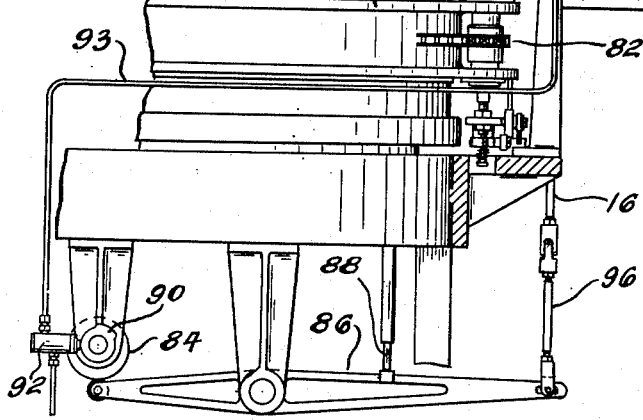
INVENTOR.
William Leroy Reiter
BY
His Attorney Patented Mar. 23, 1954

2,672,712

UNITED STATES PATENT OFFICE 2,672,712

DUMMY FEED FOR STEM MACHINES

William Leroy Reiter, Emporium, Pa., assignor to Sylvania Electric Products Inc., a corporation of Massachusetts Application August 8, 1947, Serial No. 767,423

12 Claims. (Cl. 49—2)

The present invention relates to molding machines and especially to machines for shaping glass stock into disc or cup forms having relatively short and slender metal inserts projecting therefrom. This is primarily intended as an improvement on machines for forming vacuum-tube stems or headers and the like, of the type in copending United States application Serial No. 725,894, filed February 1, 1947, of which I am a co-inventor; but it is not restricted to that particular machine.

In the machine of that application and in similar machines a mold is moved step by step through a sequence of loading, heating, forming and ejecting positions, so that various metal inserts and glass stock may be automatically placed in the mold, the glass may be fused and shaped, and the molded product finally removed from the machine. Through mechanical failure at some point it sometimes happens that molded parts or waste fragments jam in the mold. The jammed mold may be cleared by the operator supervising the machine, but in the short time allowed before renewed loading this may not be perfectly completed. The operator ordinarily has no more time than enough to crush the jammed product and pull most of it forcibly from the mold. Some fragments will ordinarily remain. One of the purposes of the present invention is to provide a device for clearing the mold cavity of loose extraneous material, whether left by the operator in removing a defective product or otherwise.

In machines of the type in the copending aplication referred to above, inserts are automatically supplied to ducts which direct them into recesses in the mold. Such inserts are to form terminal leads extending through the molded glass product or to form metal supports extending only from one side. Where headers for miniature electronic tubes are to be made, for example, the dummy leads (as supporting wires are known) are of fine wire and, being quite short, are difficult to feed reliably. The short and long leads are optionally clipped from lengths of wire in time with the machine cycle and dropped into the ducts leading to the mold to be loaded. Gravity may at times fail to accelerate the lead to the mold, especially where the insert is small and the duct is relatively long. Accordingly another aim of the invention is to promote the reliable feeding of these metal inserts into the mold.

In achieving the foregoing purposes I provide for entraining the metal insert in an air stream flowing along the duct toward the mold. More specifically I have arranged for a high velocity air jet to be directed externally along the duct toward the mold so as to develop a partial vacuum in the end of the duct nearest the mold, thereby to draw an air stream and with it the metal insert toward the mold and an insert-receiving recess therein. As a further aid in reliable feeding, the duct is reciprocated into contact with the mold, for connecting the duct to the insert-receiving recess. Lateral passages in the end of the duct sustain the air streams until the latest possible instant.

The invention, with the foregoing features and others that will become apparent, will be more fully understood from the following detailed description of a presently preferred, specific but illustrative embodiment which is shown in the accompanying drawings.

Fig. 1 is a view of the feed device shown partly in side elevation and partly in central longitudinal section, a portion of the mold into which the wire is inserted also being shown.

Fig. 2 is a top plan view of the parts seen in Fig. 1.

Fig. 3 is a fragmentary view of the lower portion of the feed duct as seen from the right of Fig. 1.

Fig. 4 is a sectional view along line 4—4 of Fig. 5.

Fig. 5 is an enlarged view, partly in elevation and partly in longitudinal central section, of the lower portion of the duct and a mold-carrying spindle associated therewith.

Fig. 6 is a top plan of the spindle.

Fig. 7 is a view similar to Fig. 5 at another phase of the machine operation.

Fig. 8 is a view from the bottom of the feed tube as seen in Fig. 7.

Fig. 9 is a fragmentary sectional detail of the spindle and an air ejector, illustrating the work being ejected therefrom.

Fig. 10 is a diagrammatic illustration of the spindle arrangement and drive chain as embodied in a so-called 30 Head Stem Machine and fully shown and described in patent application identified above.

Fig. 11 is a partial side view of a machine such as just above referred to, incorporating the illustrative embodiment of the present invention in cooperative relation with one of the spindles.

Figs. 12 and 13 are sectional details indicating the wire feed and cutting tools, respectively, as embodied in mechanism also shown in Fig. 11.

In Fig. 1, tube 10 is supported on stationary posts 12, 12ᵃ by bracket 14 which is axially slidable along those posts. Rod 16, attached to bracket 14, is reciprocated by mechanism to be described for cyclically lowering the feed tube into the lower cavity 18 of a two-part mold (the upper part not being shown) when an insert is to be loaded into a recess in that cavity.

Tube 10 in the form shown is a rigid assembly of several parts. Flared mouth portion 20 is held against lower portion 22 within sleeve 26 which has an external flange 28. Portion 22 has a gradually tapered passage 24 formed by machining its longitudinally separated halves.

A cupped U-shaped member 30 depresses flange 28 against bracket 14, by action of springs 32, 32ᵃ that are held in compression by screws 34, 34ᵃ passing through U-shaped member 33 and threaded into bracket 14. Tube 10 is inserted laterally after raising cupped member 30 manually. U-shaped member 33 is constricted at 33ᵃ for centering and retaining tube 10 after insertion. In operation tube 10 may be arrested after descending against mold 18. A limited over-travel of bracket 14 can then be accommodated by the resilient connection comprising screws 34 and 34ᵃ, springs 32 and 32ᵃ and member 30.

It is often required that passage 24 be formed to direct the inserts to recesses in mold 18 that are not at the center of the mold. For this reason passage 24 is formed eccentrically in tube 10, as illustrated in Fig. 2, and the tube is provided with an arm 36 that is accurately adjustable relative to extension 38 of bracket 14 by means of screws 40, 40ᵃ.

To the lower extremity of tube 10 there is attached a nozzle, generally indicated by the arrow and numeral 42, locked in place by split clamp 44 and screw 46. An air pressure line 48 is attached to nozzle 42 and its coupling to a hose 50 (Fig. 3) is fixed in relation to tube 10 by bracket 51. Referring to Figs. 4, 5 and 8 it will be seen that nozzle 42 is a composite structure formed of body portion 54 having a top cavity to receive section 22 about which it is clamped, and of a plug 53 having a central bore 52 aligned with passage 24 of section 22. Plug 53 and tube 10 together constitute a duct for directing inserts precisely toward the recess in the lower cavity 18 of the mold. Plug 53 is externally tapered at its lower extremity and is spaced from the interior of body portion 54 of nozzle 42 to provide an air passage 56, communicating with supply tube 48 through passage 58, of progressively reduced cross-sectional area.

When an air supply of moderate pressure is admitted to tube 48, it emerges from the lower end of passage 56 as a high velocity air jet. The air pressure in passage 58 drops as the velocity increases until at the exit of passage 56 the air velocity is very high and the pressure is reduced below that of the atmosphere, by nozzle design using Bernoulli's theorem. The high-velocity air jet is effective to purge loose particles from the mold cavity opposite nozzle 42, and at the same time it is effective to promote the travel of a small metal insert dropped into the duct. The partial vacuum produced at the exit of bore 52 draws an air stream down tube 10 which draws the metal insert along with it, and this air velocity is greatest where the bore diameter is least, at the exit. The exit constriction also directs the insert accurately to the proper portion of cavity 18, and the enlargement of the duct above the exit minimizes friction, consistent with the necessary guiding action.

Construction and operation of the illustrative mold is described in detail in the copending application identified above. For a better understanding of the present invention it may, however, be well to review certain of its characteristics. In Figs. 5, 6 and 7 the lower cavity 18 of the mold is shown as embodying a plurality of recesses 60, here arranged in a circle, and an additional recess 62 inside that circle. As can be seen from Fig. 9 recesses 60 are respectively intended to receive the ends of long leads 64 and recess 62 is intended to accommodate a short or dummy lead 66. In the illustrative product, leads 64 constitute electron-tube electrode supports and as well terminal leads, whereas dummy lead 66 is solely for mechanical support of an electrode (not shown) and does not project through the glass body 68. The support 70 of each lower cavity 18 of the several molds is tubular and contains a reciprocable rod 72 that carries a series of pins 74 at its upper end. These pins are guided in a plurality of tubes 76, one for each pin. They can be lowered to control the elevation of the inserts during molding and can also be elevated to strip and eject the completed product from the lower mold-cavity. As shown in Fig. 9 after the product is mechanically elevated by reciprocation of rod 72 and pins 74, a jet of air from nozzle 78 can be used to carry the product laterally from the mold, after which the pins are lowered and the mold is in renewed condition for re-loading and a renewed molding cycle. In the event that particles remain in the lower mold cavity after the product is or should have been removed and the mold is positioned opposite the first station for loading a wire, a blast of air from passage 56 will be effective to purge the mold cavity, recesses 60 and 62 having been cleared by the several rods 74. As the air is released the entire duct descends into contact with the mold for insertion of dummy lead 66 in this illustration. By properly timing the admission of a wire insert into tube 10 in relation to its approach to the lower mold, the insert will reach the recess in the mold at about the same time that nozzle 42 reaches the mold cavity. During the air blast, the wire insert is carried down the duct, partly by gravity and partly by action of the air current induced by the partial vacuum at the exit of the nozzle. In order that the air jet may not be blocked as the nozzle approaches the lower mold, the end of body 54 is notched at several places providing exit passages 80 for the air stream.

In the illustrated application of the invention gravity plays an important part in automatic feed of the inserts. But where the insert is of very small size it will be appreciated that gravity cannot be relied upon for properly timed delivery of the inserts. The vacuum insert transfer arrangement overcomes duct friction even where there is greatest constriction for accurate delivery, and can be used for horizontal loading of molds where gravity feed is lacking.

The illustrative molding machine to which this invention is applied is shown in Figs. 10 and 11. A plurality of spindles (represented in Fig. 10 by small dotted circles), rotated by a driving chain 82 in the preheating and molding zone, are carried intermittently in a circular path from station to station by turret or conveyor 83 having a Geneva-type drive (not shown). After a spindle has passed out of engagement with chain 82 the rotary drive of the spindle ceases and it is properly oriented with respect to the wire feeding ducts by mechanism which is not specifically important to this case. Cam 84 and lever 86, opposed by spring-pressed rod 88, act to raise rod 96 which is connected to rod 16 for reciprocating feed tube 10 into contact with the molds successively brought to rest at station A. At the same time cam 90 operates valve 92 to admit air under pressure from a supply (not shown) to lines 93 supplying eject nozzle 78 opposite station B preceding station A. The same lines supply air under pressure to tube 50 and the mold-clearing and lead-feeding nozzle 42.

By means of a cam, lever and rod mechanism located to the rear of parts 84, 86 and 96, four-motion feeding head 98 is vertically reciprocated along shafts 12, 12a to feed the wire supplied by reel 100 downward through a measured stroke, and to return for another feed stroke. Feed jaws 102, 104 in head 98 are shown in Fig. 12. Movable jaw 104 is reciprocated horizontally by a linkage coupled to shaft 105 to grip and release the wire in time with the reciprocation of head 98.

A cutting head 106 below feeding head 98 is secured by bracket 108 to shafts 12, 12a and actuated by a lever arm 109. Shaft 105 is carried by a bracket 113 for arcuate travel about shaft 12 to actuate arm 109 and feed jaw 104 and is itself oscillated about shaft 12 through pin-and-slot connection 110 by bell-crank 111 and bail 112 in timed relation with the vertical travel of head 98. Another cam, lever and rod actuator like 84, 86 and 96 are provided for this purpose.

In Fig. 13 the cutter details are shown, including a fixed gripper jaw 114 and a movable jaw 116, and fixed and movable blades 118 and 120 respectively, all operated by lever 109. In operation the fixed gripper in head 106 retains the wire during the return stroke of head 98, and the cutting blades 118, 120 become effective in time with the lower gripper. The cutters and lower gripper are separated during the feeding stroke of head 98.

No novelty is here claimed for the foregoing feed mechanism and it will be apparent that individual inserts can alternatively be fed by any suitable escapement. Furthermore, it will be apparent that other modifications of the illustrative embodiment will occur to those skilled in the art without departing from the invention.

What I claim is:

1. In combination, a mold cavity having a recess for receiving a metal insert, a duct opposite said cavity for directing inserts individually into said recess, and a pneumatic system for entraining said inserts in an air stream flowing along said duct toward said mold for transferring an insert into the recess.

2. In combination, a mold cavity having a recess for receiving a metal insert, a duct opposite said cavity for directing inserts individually into said recess, and a pneumatic system for entraining said inserts in an air stream flowing along said duct toward said mold for transferring an insert into the recess, said pneumatic system including a nozzle for directing a high-velocity air stream toward said mold to purge it of loose particles.

3. In combination, a glass-shaping mold having a mold cavity and a wall of said cavity having a recess for receiving and holding a metal insert while glass is molded about it, a duct having an end in axial alignment with said recess for directing inserts individually to seat in said recess, said recess being closed at its bottom end and an air passage along said duct and directed toward its end for reducing the pressure in said duct, thereby drawing an air stream from said duct for promoting transfer of an insert from said duct into said recess.

4. In combination, a glass-shaping mold, a duct opposite said mold for directing metal inserts toward said mold, means to secure said inserts in a fixed position in said mold, an air passage surrounding said duct and having reduced cross-sectional area adjacent the end of said duct nearest said mold, thereby to produce a partial vacuum in said duct for transferring an insert from said duct toward said mold.

5. Apparatus according to claim 4 wherein said passage is arranged to direct air toward said mold thereby additionally functioning to purge said mold of loose particles.

6. In combination, a plurality of header molds each having a mold cavity and a wall of said cavity containing at least one recess having a closed bottom, said recess being adapted to receive and hold an insert in a position extending into said cavity, a mold conveyor, a duct opposite one of said molds for directing inserts into said recess individually and into the other molds successively moved opposite said duct by said conveyor, and a vacuum system having a connection to said duct separate from and independent of said recess for transferring inserts from said duct into one of said molds.

7. In combination, a plurality of header molds, each having a mold cavity and a wall of said cavity containing at least one recess having a closed bottom, said recess being adapted to receive and hold an insert in a position extending into said cavity, a mold conveyor, a duct past which said molds are moved in succession by said conveyor, said duct being adapted to direct metal inserts individually toward the mold opposite it and into said recess and reciprocable into contact with said mold, and a vacuum device having a connection to said duct separate from and independent of said recess for promoting transfer of an insert into seated position in said recess.

8. In combination, a plurality of header molds, a mold conveyor, a duct past which said molds are carried step-by-step by said conveyor, a device for supplying inserts to said duct intermittently in timed relation with said conveyor, an air passage along said duct and directed toward its end for producing a partial vacuum in said duct to accelerate the inserts and for purging said mold of loose particles, and cam actuated mechanism for providing said passage with air under pressure and for simultaneously actuating said insert-supplying device.

9. Apparatus according to claim 8 wherein said duct is reciprocably mounted for movement into contact with said mold and wherein cam mechanism is provided for moving said duct toward said mold during application of the air pressure.

10. Apparatus according to claim 9 wherein said duct and its reciprocating mechanism includes a yielding connection allowing over-travel of said mechanism after said duct has contacted said mold.

11. In combination, a glass-shaping mold having a mold cavity therein and a recess in a wall of said cavity for receiving a metal insert and holding it in fixed position, extending into said mold cavity, a duct for directing inserts individually toward said recess, an air passage along said duct and directed toward its end for reducing the pressure in said duct below atmospheric pressure, and a mechanism for releasing an air jet down said passage and for moving said duct into contact with said mold, thereby to clear said mold of loose particles and to promote transfer of an insert from said duct into said mold.

12. Apparatus according to claim 11 wherein the mechanism for moving said duct into contact with said mold includes a yielding connection to allow overtravel of said mechanism after said duct contacts said mold.

WILLIAM LEROY REITER.

References Cited in the file of this patent
UNITED STATES PATENTS

| Number | Name | Date |
|---|---|---|
| 2,405,074 | Underwood | July 30, 1946 |
| 2,411,660 | Manning | Nov. 26, 1946 |